United States Patent
Tanaka

(10) Patent No.: US 11,130,884 B2
(45) Date of Patent: Sep. 28, 2021

(54) ADHESIVE COMPOSITION

(71) Applicant: KANEKA CORPORATION, Osaka (JP)

(72) Inventor: Hidenori Tanaka, Osaka (JP)

(73) Assignee: KANEKA CORPORATION, Osaka (JP)

( * ) Notice: Subject to any disclaimer, the term of this patent is extended or adjusted under 35 U.S.C. 154(b) by 156 days.

(21) Appl. No.: 16/405,357

(22) Filed: May 7, 2019

(65) Prior Publication Data

US 2019/0256744 A1    Aug. 22, 2019

Related U.S. Application Data

(63) Continuation of application No. PCT/JP2017/040088, filed on Nov. 7, 2017.

(30) Foreign Application Priority Data

Nov. 7, 2016  (JP) .............................. JP2016-216925

(51) Int. Cl.
| | |
|---|---|
| C09J 4/06 | (2006.01) |
| C09J 133/08 | (2006.01) |
| C09J 133/00 | (2006.01) |
| C09J 11/06 | (2006.01) |

(52) U.S. Cl.
CPC ................. C09J 4/06 (2013.01); C09J 11/06 (2013.01); C09J 133/00 (2013.01); C09J 133/08 (2013.01); C09J 2301/416 (2020.08)

(58) Field of Classification Search
CPC . C08F 8/14; C08F 290/046; C09J 4/06; C09J 11/06; C09J 133/00; C09J 133/08
See application file for complete search history.

(56) References Cited

U.S. PATENT DOCUMENTS

| | | | |
|---|---|---|---|
| 9,695,337 B2 * | 7/2017 | Kishioka | C09J 133/24 |
| 10,982,115 B2 * | 4/2021 | Andou | C09J 133/18 |
| 2009/0082488 A1 * | 3/2009 | Takeda | C08F 8/26 |
| | | | 522/182 |
| 2019/0071589 A1 * | 3/2019 | Ieda | B32B 5/32 |

FOREIGN PATENT DOCUMENTS

| | | |
|---|---|---|
| JP | 2001-55551 A | 2/2001 |
| JP | 2005-232419 A | 9/2005 |
| JP | 2006-291073 A | 10/2006 |
| JP | 2007-77182 A | 3/2007 |
| JP | 2012122022 A | 6/2012 |
| JP | 2012-211216 A | 11/2012 |
| JP | 2015-71719 A | 4/2015 |
| JP | 2016-88944 A | 5/2016 |
| JP | 5964590 B2 | 8/2016 |

OTHER PUBLICATIONS

Extended European Search Report issued in corresponding European Application No. 17868096.3; dated Feb. 21, 2020 (9 pages).
International Search Report issued in International Application No. PCT/JP2017/040088, dated Dec. 12, 2017 (5 pages).
Written Opinion issued in International Application No. PCT/JP2017/040088, dated Dec. 12, 2017 (3 pages).
SciFinder, a CAS Solution; Substance Detail, CAS Registry No. 898568-18-8; The American Chemical Society; Obtained from Internet on Apr. 23, 2021 <https://scifinder.cas.org> (2 pages).

* cited by examiner

Primary Examiner — Sanza L. McClendon
(74) Attorney, Agent, or Firm — Osha Bergman Watanabe & Burton LLP

(57) ABSTRACT

An adhesive composition may include 100 parts by weight of a (meth)acrylic polymer (A), 45 to 65 parts by weight of isoboronyl acrylate (B), and 0.1 to 10 parts by weight of a photoradical polymerization initiator (C). Each molecule of the (meth)acrylic polymer (A) may have at least one group represented by the general formula (1) at a molecular terminal: —OC(O)C($R^1$)=$CH_2$ (1), where $R^1$ is a hydrogen atom or an organic group containing 1 to 20 carbon atoms. The (meth)acrylic polymer (A) may have a number average molecular weight (Mn) of 3,000 to 100,000, and a ratio (Mw/Mn) of a weight average molecular weight (Mw) to a number average molecular weight (Mn) of less than 1.8.

4 Claims, No Drawings

ADHESIVE COMPOSITION

TECHNICAL FIELD

One or more embodiments of the present invention relate to an adhesive composition containing a (meth)acrylic polymer curable by active energy rays, and to an adhesive.

BACKGROUND

Acrylic adhesives are produced in large amounts and are an alternative to natural rubber-based adhesives. However, solvent type acrylic adhesives may cause air pollution, and emulsion type acrylic adhesives can require a large amount of energy to evaporate water.

In order to address the above, photopolymerizable adhesives have been proposed. However, in many cases, a low molecular weight compound having a (meth)acryloyl group is used for this photopolymerizable composition, and volatilization of an unreacted compound from a cured product may cause an undesirable odor. Thus, an oligomer having a (meth)acryloyl group is used. However, it tends to be synthetically difficult to obtain oligomers with large molecular weights.

Under these circumstances, an adhesive composition mainly containing a vinyl polymer having a (meth)acryloyl group at a molecular terminal and having a large molecular weight has been proposed (Patent Literature 1). However, adhesives obtained from such a composition tend to have a low adhesive force. In addition, although a curable composition containing a vinyl monomer having a cyclic structure is also disclosed (Patent Literature 2), an excellent adhesive force tends not to be obtained.

CITATION LIST

Patent Literature

PTL 1: Japanese Patent Application Laid-Open No. 2001-55551
PTL 2: Japanese Patent Application Laid-Open No. 2007-77182

SUMMARY

One or more embodiments of the present invention provide an adhesive which is cured by active energy rays and exhibits an excellent adhesive force.

The inventors have found the following, thereby providing one or more embodiments of the present invention.

That is, one or more embodiments of the present invention may include the following:

(1) An adhesive composition containing components (A) to (C) below:

100 parts by weight of a (meth)acrylic polymer (A), the (meth)acrylic polymer (A) having at least one group represented by general formula (1) per molecule at a molecular terminal:

in which $R^1$ represents hydrogen or an organic group containing 1 to 20 carbon atoms, having a number average molecular weight of 3,000 to 100,000, and having a ratio (Mw/Mn) of a weight average molecular weight (Mw) to a number average molecular weight (Mn) of less than 1.8;

45 to 65 parts by weight of isoboronyl acrylate (B); and 0.1 to 10 parts by weight of a photoradical polymerization initiator (C).

(2) The adhesive composition according to (1), in which the (meth)acrylic polymer (A) is a copolymer containing n-butyl acrylate and 2-ethylhexyl acrylate as monomer components.

(3) The adhesive composition according to (2), in which a weight ratio (n-butyl acrylate/2-ethylhexyl acrylate) of n-butyl acrylate and 2-ethylhexyl acrylate constituting the (meth)acrylic polymer (A) is 20/80 to 80/20.

(4) The adhesive composition according to any one of (1) 3 containing 0.05 to 4.00 parts by weight of an acrylic acid (D) based on 100 parts by weight of the (meth)acrylic polymer (A).

(5) An adhesive containing the adhesive composition according to any one of (1) to (4) cured by light.

(6) The adhesive according to (5), in which a light source is selected from a high-pressure mercury lamp, a metal halide lamp, a UV-LED, and an LED.

By using the adhesive composition of one or more embodiments of the present invention, an adhesive which is cured by active energy rays and exhibits an excellent adhesive force can be obtained.

DETAILED DESCRIPTION OF THE EMBODIMENTS

Hereinafter, one or more embodiments of the present invention will be described in detail.

An adhesive composition according to one or more embodiments of the present invention contains a (meth)acrylic polymer (A) having at least one group represented by general formula (1) per molecule at a molecular terminal:

in which $R^1$ represents hydrogen or an organic group containing 1 to 20 carbon atoms, having a number average molecular weight of 3,000 to 100,000 and having a ratio (Mw/Mn) of a weight average molecular weight (Mw) to a number average molecular weight (Mn) of less than 1.8. In the present specification, (meth)acrylic means either one or both of acrylic and methacrylic.

In one or more embodiments, the number of the group represented by the general formula (1) is 1 or more, and preferably 1.5 or more per molecule of the (meth)acrylic polymer (A), from the viewpoint of improving curability. On the other hand, the number of the group is preferably 3 or less, more preferably 2.5 or less, from the viewpoint of improving adhesive force. In the (meth)acrylic polymer (A) of one or more embodiments, the group represented by the general formula (1) is preferably present at least at a molecular terminal from the viewpoint of rubber elasticity. In the (meth)acryloyl polymer (A) of one or more embodiments, the number of the group present at the molecular terminal and represented by the general formula (1) is preferably 1 or more and 2 or less from the viewpoint of curability and adhesive force.

Specific examples of $R^1$ in the general formula (1) include, but are not particularly limited to, —H, —$CH_3$, —$CH_2CH_3$, —$(CH_2)_nCH_3$ (n represents an integer of 2 to 19), —$C_6H_5$, —$CH_2OH$, and —CN. From the viewpoint of reactivity, —H and —$CH_3$ are preferable.

In one or more embodiments, the (meth)acrylic polymer (A) has a number average molecular weight of 3,000 to 100,000, and preferably 30,000 to 80,000, as measured by gel permeation chromatography (GPC). When the molecular weight is too low, flexibility of a cured product is impaired, and sufficient rubber elasticity cannot be obtained, including reduction in elongation. On the other hand, if the molecular weight is too high, the viscosity becomes high, so that the handling tends to be difficult.

In one or more embodiments, the meth)acrylic polymer (A) has a molecular weight distribution (a ratio (Mw/Mn) of a weight average molecular weight (Mw) to a number average molecular weight (Mn) measured by GPC) of less than 1.8, preferably 1.7 or less, more preferably 1.6 or less, still more preferably 1.5 or less, particularly preferably 1.4 or less, and most preferably 1.3 or less. When the molecular weight distribution is too large, it tends to be difficult to control mechanical properties of a cured product to be obtained. Regarding the GPC measurement of one or more embodiments of the present invention, chloroform is used as a mobile phase, the measurement is carried out with a polystyrene gel column, and the number average molecular weight and the like can be obtained in terms of polystyrene.

A (meth)acrylic monomer constituting the main chain of the (meth)acrylic polymer (A) is not particularly limited, and various monomers can be used. Examples thereof include (meth)acrylic acid; and (meth)acrylic esters such as methyl (meth)acrylate, ethyl (meth)acrylate, n-propyl (meth)acrylate, isopropyl (meth)acrylate, n-butyl (meth) acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth) acrylate, toluyl (meth)acrylate, benzyl (meth)acrylate, 2-methoxyethyl (meth)acrylate, 3-methoxybutyl (meth) acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, γ-(methacryloyloxypropyl)trimethoxysilane, ethylene oxide adducts of (meth) acrylic acid, trifluoromethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth) acrylate, 2-perfluoromethyl-2-perfluoroethylmethyl (meth) acrylate, 2-perfluorohexylethyl (meth)acrylate, 2-perfluorodecylethyl (meth)acrylate, and 2-perfluorohexadecylethyl (meth)acrylate. These may be used singly or a plurality of them may be copolymerized. Particularly, since an adhesive obtained exhibits an excellent adhesive force, the (meth)acrylic polymer (A) preferably contains n-butyl acrylate and/or 2-ethylhexyl acrylate as a monomer component, and it is more preferable that the (meth)acrylic polymer (A) is a copolymer containing n-butyl acrylate and 2-ethylhexyl acrylate as a monomer component. When the (meth) acrylic polymer (A) is a copolymer containing n-butyl acrylate and 2-ethylhexyl acrylate, a weight ratio (n-butyl acrylate/2-ethylhexylacrylate) of n-butyl acrylate and 2-ethylhexyl acrylate constituting the (meth)acrylic polymer (A) is preferably 20/80 to 80/20, from the viewpoint of obtaining a more excellent adhesive force.

In one or more embodiments, the (meth)acrylic polymer (A) can be obtained by various polymerization methods, and the polymerization method is not particularly limited; however, from the viewpoint of versatility of monomers, easiness of control, and the like, a radical polymerization method is preferable, and among radical polymerization methods, a controlled radical polymerization method is more preferable. The controlled radical polymerization method can be classified into a "chain transfer agent method" or a "living radical polymerization method". The living radical polymerization method is more preferable where the molecular weight d molecular weight distribution of the (meth)acrylic polymer (A) to b obtained can be easily controlled, and from the viewpoint of availability of raw materials and ease of introduction of functional group on the polymer terminal, atom transfer radical polymerization method is particularly preferable. The radical polymerization method, the controlled radical polymerization method, the chain transfer agent method, the living radical polymerization method, and the atom transfer radical polymerization method are known polymerization methods, and for each of these polymerization methods, the description in, for example. Japanese Patent Application Laid-Open No. 2005-232419, Japanese Patent Application Laid-Open No. 2006-291073 or the like can be referred to.

Examples of the atom transfer radical polymerization which is one of preferable synthesis methods of the (meth) acrylic polymer (A) include the method disclosed in paragraphs (0054) to (0080) of Japanese Patent Application Laid-Open No. 2016-88944.

Examples of a method for introducing the group represented by the general formula (1) in the (meth)acrylic polymer (A) include the method disclosed in paragraphs (0081) to (0087) of Japanese Patent Application Laid-Open No. 2016-88944.

A content of the (meth)acrylic polymer (A) in the adhesive composition of one or more embodiments of the present invention is preferably 50 to 80% by weir=t more preferably 55 to 75% by weight, and still more preferably 60 to 70% by weight, based on 100% by weight of the adhesive composition. By setting the content of the (meth)acrylic polymer (A) within the above range, the adhesive force of the adhesive tends to be further improved.

The adhesive composition of one or more embodiments of the present invention contains 45 to 65 parts by weight of isoboronyl acrylate (B) based on 100 parts by weight of the (meth)acrylic polymer (A). When the content of the isoboronyl acrylate (B) is below the range, a sufficient effect cannot be obtained, and an excellent adhesive force tends not to be obtained. When the content of the isoboronyl acrylate (B) is above the range, the adhesive becomes too hard, and an excellent adhesive force tends not to be obtained. A lower limit of the blending amount of the isoboronyl acrylate (B) is preferably 46 parts by weight e, more preferably 48 parts by weight or more, and still more preferably 50 parts by weight or more. An upper limit of the blending amount of the isoboronyl acrylate (B) is preferably 64 pails by weight or less, more preferably 62 parts by weight or less, and still more preferably 60 parts by weight or less.

In one or more embodiments of the present invention, the isoboronyl acrylate is contained in the above-mentioned range, so that it is possible to exhibit a specifically excellent adhesive force. Even if another acrylate ester is blended instead of the isoboronyl acrylate, the same adhesive force as provided by one or more embodiments of the present invention cannot be achieved. In the mechanism for expressing this excellent adhesive force by the isoboronyl acrylate, a domain formed by the (meth)acrylic polymer (A), a domain formed by a polymer of the isoboronyl acrylate (B), and a domain formed by the (meth)acrylic polymer (A) and the polymer of the isoboronyl acrylate (B) are present in a cured product obtained from the adhesive composition, and it is presumed that the cured product has high strength and high elongation due to this unique morphology.

The adhesive composition of one or more embodiments of the present invention may or may not contain an acrylic acid (D). The adhesive force can be further improved by blending an acrylic acid. When the acrylic acid (D) is contained, a content thereof is preferably 0.05 to 4.00 parts by weight based on 100 parts by weight of the (meth)acrylic polymer (A). When the content of the acrylic acid (D) is below the range, there is a possibility that the effect of improving the adhesive force by blending the acrylic acid (D) may not be obtained. When the content of the acrylic acid (D) is above the range, the adhesive force tends to decrease. A lower limit of the content of the acrylic acid (D) is preferably 0.08 parts by weight or more, and more preferably 0.1 parts by weight more. An upper limit of the content of the acrylic acid (D) is more preferably 3.0 parts by weight or less, further preferably 2.0 parts by weight and particularly preferably 1.0 parts by weight or less.

The adhesive composition of one or more embodiments of the present invention contains a photoradical polymerization initiator (C). Examples of the photoradical polymerization initiator (C) include, but are not particularly limited to, acetophenone, propiophenone, benzophenone, xanthol, fluorene, benzaldehyde, anthraquinone, triphenylamine, carbazole, 3-methylacetophenone, 4-methylacetophenone, 3-pentylacetophenone, 2,2-diethoxyacetophenone, 4-methoxyacetophenone, 3-bromoacetophenone 4-allylacetophenone, p-diacetylbenzene, 3-methoxybenzophenone, 4-methylbenzophenone, 4-chlorobenzophenone, 4,4'-dimethoxybenzophenone, 4-chloro 4'-benzylbenzophenone, 3-chloroxanthone, 3,9-dichloroxanthone, 3-chloro-8-nonylxanthone, benzoyl, benzoin methyl ether, benzoin butyl ether, bis(4-dimethylaminophenyl) ketone, benzyl methoxy ketal, 2-chlorothioxanthone, 2,2-dimethoxy-2-diphenylethan-1-one, 1-hydroxy-cyclohexyl-phenyl-ketone, 2-hydroxy-2-methyl-1-phenyl-propan-1-one, 2-methyl-1-[4-(methylthio)phenyl]-2-morpholinopropan-1-one, and 2-benzyl-2-dimethylamino-1-(4-morpholinophenyl)-butanone-4. Among them, phenyl ketone compounds are preferred in that they have a tackiness improving property.

As the photoradical polymerization initiator (C) of one or more embodiments, an acylphosphine oxide-based photopolymerization initiator having excellent depth curability upon UV irradiation can be also blended. Examples of the acylphosphine oxide-based photopolymerization initiator include 2,4,6-trimethylbenzoyl-diphenyl-phosphine oxide, bis(2,4,6-trimethylbenzoyl)-phenylphosphine oxide, bis(2,6-dimethoxybenzoyl)-2,4,4-trimethyl-pentylphosphine oxide, bis(2,6-dimethylbenzoyl)-phenylphosphine oxide, bis(2,4,6-trimethylbenzoyl)-isobutylphosphine oxide, bis(2,6-dimethoxybenzoyl)-isobutylphosphine oxide, and bis(2,6-dimethoxybenzoyl)-phenylphosphine oxide. Of these photopolymerization initiators, 2,4,6-trimethylbenzoyl-diphenyl-phosphine oxide, bis(2,4,6-trimethylbenzoyl)-phenylphosphine oxide, and bis(2,6-dimethoxybenzoyl)-2,4,4-trimethyl-pentylphosphine oxide are preferable. These photoradical polymerization initiators may be used alone, or two or more kinds of them may be used in combination. Of these photoradical polymerization initiators, 1-hydroxy-cyclohexyl-phenyl-ketone, 2-hydroxy-2-methyl-1-phenyl-propan-1-one, 2,2-dimethoxy-1,2-diphenylethan-1-one, 2,4,6-trimethylbenzoyl-diphenyl-phosphine oxide, and bis trimethylbenzoyl)-phenylphosphine oxide are preferable because of their high reactivity.

In the adhesive composition of one or more embodiments of the present invention, the acylphosphine oxide and the phenylketone-based compound can also be used in combination.

The adhesive composition of one or more embodiments of the present invention contains 0.1 to 10 parts by weight of the photoradical polymerization initiator (C) based on 100 parts by weight of the (meth)acrylic polymer (A). When the content of the photoradical polymerization initiator (C) is below this range, there is a possibility that sufficient curability may not be obtained, and when the content thereof is above this range, there is a possibility that a cured product may be affected. When a mixture of the photoradical polymerization initiator (C) is used, the total amount of the mixture is preferably within the above range.

The adhesive composition of one or more embodiments of the present invention may further contain known or common other components included in conventional adhesives.

The adhesive composition of one or more embodiments of the present invention can be obtained, for example, by blending the respective constituent components and, if necessary, by performing mixing or defoaming.

The adhesive composition of one or more embodiments of the present invention can be cured by light. Examples of the light sources include, but are not particularly limited to, low pressure mercury lamps, cold cathode fluorescent lamps (CCFL), fluorescent lamps, incandescent bulbs, medium pressure mercury lamps, high pressure mercury lamps, ultra-high-pressure mercury lamps, carbon arc lamps, metal halide lamps, gallium lamps, tungsten lamps, xenon lamps, mercury xenon lamps, chemical lamps, electrodeless discharge lamps, zirconium lamps, field emission lamps, ultraviolet excimer fluorescent lamps, organic Et, LED, and UV-LED, depending on properties of the photoradical polymerization initiator to be used. Among them, a high-pressure mercury lamp, a metal halide lamp, a UV-LED, and an LED are preferable because of easy handling and economic efficiency.

The adhesive composition of one or more embodiments of the present invention is cured by light to become an adhesive exhibiting an excellent adhesive force. Examples of a method for measuring the adhesive force may include a peeling test method described in JIS Z 0237; however, a method suitable for the purpose of using the adhesive can be adopted. When the adhesive force is evaluated by a 180° peeling test, the value after 2 days when the adhesive force is stabilized after an adhesive is applied to a base material is important, and for example, from the viewpoint of firmly adhering the base material, the adhesive force is preferably 32 N/25 mm or more.

Although the adhesive of one or more embodiments of the present invention is not particularly limited, the adhesive can be used as, for example, optical clear resin (OCR), optically clear adhesive (OCA), adhesives for electronic equipment, adhesives for medical use, adhesives for automobiles, and adhesives for buildings.

EXAMPLES

Specific Examples of one or more embodiments of the present invention will be described together with Comparative Examples, but the present invention is not limited to the following Examples.

Synthesis Example 1

In accordance with the known method (described in Japanese Patent Application Laid-Open No. 2012-211216), cuprous bromide as a catalyst, pentamethyldiethylenetriamine as a ligand, diethyl-2,5-dibromoadipate as an initiator, and a mixture of 50 parts by weight of n-butyl acrylate and 50 parts by weight of 2-ethylhexyl acrylate as a monomer were subjected to polymerization at a weight-based ratio of a monomer/(diethyl-2,5-dibromoadipate) of 400 to obtain a bromine-terminated poly(n-butyl acrylate)/(2-ethylhexyl acrylate) copolymer.

This polymer was dissolved in N, N-dimethylacetamide, potassium acrylate was added thereto, and the mixture was heated with stirring at 70° C. in a nitrogen atmosphere. After distilling off the N, N-dimethylacetamide in the mixture under reduced pressure, butyl acetate was added to the residue, and the insoluble matter was removed by filtration. The butyl acetate in the filtrate was distilled off under reduced pressure to obtain a poly(n-butyl acrylate)/(2-ethylhexyl acrylate) copolymer (A1) having acryloyl groups at both terminals.

The number average molecular weight of the polymer (A1) was about 60,000, and the molecular weight distribution thereof was 1.4. The "number average molecular weight" and the "molecular weight distribution (a ratio of the weight average molecular weight to the number average molecular weight)" were calculated by a standard polystyrene equivalent method using gel permeation chromatography (GPC). A GPC column packed with a polystyrene crosslinked gel (Shodex GPC K-804, K-802.5; manufactured by SHOW DENKO K. K.) was used, and chloroform was used as a GPC solvent.

The average number of acryloyl groups introduced per one molecule of the polymer was found to be about 1.9 as determined by $^1$H-NMR analysis. The number of functional groups introduced per one molecule of the polymer was calculated based on concentration analysis by $^1$H-NMR and number average molecular weight determined by GPC. However, NMR was measured at 23° C. using an ASX-400 manufactured by Bruker and deuterated chloroform as a solvent.

Examples 1 to 5

The polymer (A1) obtained in Synthesis Example 1, isoboronyl acrylate, and a photoradical polymerization initiator were added into a disposable cup, stirred thoroughly with a spatula, and stirred and defoamed with "Awatori Rentaro" ARE-310 by THINKY to obtain an adhesive composition.

The obtained composition was poured into a Teflon (registered trademark) mold having an inner dimension of 25 mm in width, 125 mm in length, and 1 mm in thickness, and allowed to stand still so as to be subjected to defoaming. Then, a polyethylene terephthalate film having a width of 25 mm, a length of 150 mm, and a thickness of 25 μm was stuck to the composition.

While the polyethylene terephthalate film was stuck, the composition was irradiated with UV light from a UV irradiation apparatus model: LIGHT HAMMER 6, light source: mercury lamp) manufactured by Fusion UV Systems Japan K. K. to cure the composition and thus to produce an adhesive tape.

The obtained adhesive tape was stuck to a stainless-steel plate SUS #304 (manufactured by Engineering Test Service) whose surface finish was BA (bright heat treatment after cold rolling) using a 2 kg pressure-bonding roller After a lapse of 1 hour after the sticking and 2 days after the sticking, a 180° peeling test was conducted under conditions of 23° C., 55 RH and a peeling rate of 300 mm/min using an autograph (AG-2000A) manufactured by Shimadzu Corporation, and the adhesive force was measured.

The blending amount of the adhesive composition and the results of the peeling test are shown in Table 1.

Examples 6 to 10

An adhesive was prepared in the same manner as in Examples 1 to 5 except that acrylic acid was used in combination, and a 180° peeling test was conducted.

The blending amount of the adhesive composition and the results of the peeling test are shown in Table 1.

TABLE 1

| Composition (part(s) by weight) | | Example | | | | | | | | | |
|---|---|---|---|---|---|---|---|---|---|---|---|
| | | 1 | 2 | 3 | 4 | 5 | 6 | 7 | 8 | 9 | 10 |
| (Meth)acrylic polymer (A-1) | | 100 | 100 | 100 | 100 | 100 | 100 | 100 | 100 | 100 | 100 |
| Isoboronyl acrylate (B) [1] | | 50 | 50 | 50 | 50 | 60 | 50 | 50 | 50 | 50 | 50 |
| Acrylic acid (D) [2] | | | | | | | 0.1 | 0.5 | 1 | 3 | 5 |
| Photoradical polymerization initiator (C-1) | DAROCUR1173 [3] | 2 | 2 | 2 | 1 | 2 | 2 | 2 | 2 | 2 | 2 |
| Photoradical polymerization initiator (C-2) | IRGACURE819 [4] | 1 | 1 | 1 | 0.5 | 1 | 1 | 1 | 1 | 1 | 1 |
| UV light: irradiation conditions | Peak illuminance (mW/cm$^2$) | 500 | 250 | 100 | 250 | 250 | 250 | 250 | 250 | 250 | 250 |
| | Integrated light quantity (mJ/cm$^2$) | 2000 | 2000 | 2000 | 2000 | 2000 | 2000 | 2000 | 2000 | 2000 | 2000 |
| 180° peeling test (N/25 mm) | After 1 hour | 35.1 | 39.6 | 41.8 | 36.3 | 39.2 | 40.0 | 45.6 | 50.5 | 15.6 | 10.1 |
| | After 2 days | 48.8 | 41.3 | 54.2 | 54.5 | 49.0 | 46.2 | 47.3 | 50.2 | 49.3 | 34.5 |

[1] IBXA from Osaka Organic Chemical Industry Ltd.
[2] from Wako Pure Chemical Industries, Ltd.
[3],[4] flora BASF Japan Comparative Examples 1 to 7

An adhesive was prepared in the same manner as in Examples 1 to 5, using the polymer (A1) obtained in Synthesis Example 1, isoboronyl acrylate, and a photoradical polymerization initiator, and a 180° peeling test was conducted.

The blending amount of the adhesive composition and the results of the peeling test are shown in Table 2.

TABLE 2

| Composition (part(s) by weight) | | Comparative Example | | | | | | |
|---|---|---|---|---|---|---|---|---|
| | | 1 | 2 | 3 | 4 | 5 | 6 | 7 |
| (Meth)acrylic polymer (A-1) | | 100 | 100 | 100 | 100 | 100 | 100 | 100 |
| Isoboronyl acrylate (B) | | 25 | 30 | 40 | 70 | 90 | 100 | 100 |
| Photoradical polymerization initiator (C-1) | DAROCUR1173 | 2 | 2 | 2 | 2 | 2 | 2 | 1 |
| Photoradical polymerization initiator (C-2) | IRGACURE819 | 1 | 1 | 1 | 1 | 1 | 1 | 0.5 |
| UV light irradiation conditions | Peak illuminance (mW/cm$^2$) | 250 | 250 | 250 | 250 | 250 | 250 | 250 |
| | Integrated light quantity (mJ/cm$^2$) | 2000 | 2000 | 2000 | 2000 | 2000 | 2000 | 2000 |
| 180° peeling test (N/25 mm) | After 1 hour | 23.8 | 25.9 | 25.7 | 17.2 | 1.4 | 0 | 0 |
| | After 2 days | 28.9 | 30.2 | 30.2 | 22.0 | 0.2 | 0 | 0 |

Comparative Examples 8 and 9

An adhesive was prepared in the same manner as in Examples 1 to 5, using the polymer obtained in Synthesis Example 1 and a photoradical polymerization initiator, and a 180° peeling test was conducted.

The blending amount of the adhesive composition and the results of the peeling test are shown in Table 3.

TABLE 3

| Composition (part(s) by weight) | | Comparative Example | |
|---|---|---|---|
| | | 8 | 9 |
| (Meth)acrylic polymer (A-1) | | 100 | 100 |
| Photoradical polymerization initiator (C-1) | DAROCUR1173 | 2 | 1 |
| Photoradical polymerization initiator (C-2) | IRGACURE819 | 1 | 0.5 |
| UV light irradiation conditions | Peak illuminance (mW/cm$^2$) | 250 | 250 |
| | Integrated light quantity (mJ/cm$^2$) | 2000 | 2000 |
| 180° peeling test (N/25 mm) | After 1 hour | 6.7 | 6.5 |
| | After 2 days | 7.3 | 8.0 |

Comparative Examples 10 to 13

An adhesive was prepared in the same manner as in Examples 1 to 5 except that acryloylmorpholine was used instead of isoboronyl acrylate, and a 180° peeling test was conducted.

The blending amount of the adhesive composition and the results of the peeling test are shown in Table 4.

TABLE 4

| Composition (part(s) by weight) | | Comparative Example | | | |
|---|---|---|---|---|---|
| | | 10 | 11 | 12 | 13 |
| (Meth)acrylic polymer (A-1) | | 100 | 100 | 100 | 100 |
| Acryloylmorpholine[5] | | 5 | 10 | 25 | 50 |
| Photoradical polymerization initiator (C-1) | DAROCUR1173 | 2 | 2 | 2 | 2 |
| Photoradical polymerization initiator (C-2) | IRGACURE819 | 1 | 1 | 1 | 1 |
| UV light irradiation conditions | Peak illuminance (mW/cm$^2$) | 250 | 250 | 250 | 250 |
| | Integrated light quantity (mJ/cm$^2$) | 2000 | 2000 | 2000 | 2000 |
| 180° peeling test (N/25 mm) | After 1 hour | 4.9 | 0.6 | 1.7 | 1.7 |
| | After 2 days | 5.1 | 0.6 | 1.9 | 1.9 |

[5]ACMO from K J Chemicals Corporation

Comparative Examples 14 to 17

An adhesive was prepared in the same manner as in Examples 1 to 5 except that dicyclopentanyl acrylate was used instead of isoboronyl acrylate. A 180° peeling test was conducted in the same manner except that the test was conducted after a lapse of 3 days after an adhesive tape was stuck to a SUS substrate.

The blending amount of the adhesive composition and the results of the peeling test are shown in Table 5.

TABLE 5

| Composition (part(s) by weight) | | Comparative Example | | | |
|---|---|---|---|---|---|
| | | 14 | 15 | 16 | 17 |
| (Meth)acrylic polymer (A-1) | | 100 | 100 | 100 | 100 |
| Dicyclopentanyl acrylate[6] | | 5 | 10 | 25 | 50 |
| Photoradical polymerization initiator (C-1) | DAROCUR1173 | 2 | 2 | 2 | 2 |
| Photoradical polymerization initiator (C-2) | IRGACURE819 | 1 | 1 | 1 | 1 |
| UV light irradiation conditions | Peak illuminance (mW/cm$^2$) | 250 | 250 | 250 | 250 |
| | Integrated light quantity (mJ/cm$^2$) | 2000 | 2000 | 2000 | 2000 |
| 180° peeling test (N/25 mm) | After 1 hour | 9.0 | 10.6 | 11.3 | 17.4 |
| | After 3 days | 9.8 | 12.0 | 17.2 | 20.9 |

[6]FA-513AS from Hitachi Chemical Co., Ltd.

Comparative Examples 18 and 19

An adhesive was prepared in the same manner as in Examples 1 to 5 except that isononyl acrylate was used instead of isoboronyl acrylate. A 180° peeling test was conducted in the same manner except that the test was conducted after a lapse of 3 days after an adhesive tape was stuck to a SUS substrate.

The blending of the adhesive composition and the results of the peeling test are shown in Table 6.

TABLE 6

| Composition (part(s) by weight) | | Comparative Example | |
|---|---|---|---|
| | | 18 | 19 |
| (Meth)acrylic polymer (A-1) | | 100 | 100 |
| Isononyl acrylate[7] | | 50 | 100 |
| Photoradical polymerization initiator (C-1) | DAROCUR1173 | 2 | 2 |
| Photoradical polymerization initiator (C-2) | IRGACURE819 | 1 | 1 |
| UV light irradiation conditions | Peak illuminance (mW/cm$^2$) | 400 | 400 |
| | Integrated light quantity (mJ/cm$^2$) | 2000 | 2000 |
| 180° peeling test (N/25 mm) | After 1 hour | 10.3 | 19.0 |
| | After 3 days | 10.1 | 13.0 |

[7]INAA from Osaka Organic Chemical Indusuy Ltd.

Comparative Examples 20 to 23

An adhesive was prepared in the same manner as in Examples 1 to 5 except that isostearyl acrylate was used instead of isoboronyl acrylate. A 180° peeling test was conducted in the same manner except that the test was conducted after a lapse of 3 days after an adhesive tape was stuck to a SUS substrate.

The blending amount of the adhesive composition and the results of the peeling test are shown in Table 7.

TABLE 7

| Composition (part(s) by weight) | | Comparative Example | | | |
|---|---|---|---|---|---|
| | | 20 | 21 | 22 | 23 |
| (Meth)acrylic polymer (A-1) | | 100 | 100 | 100 | 100 |
| Isostearyl acrylate[8] | | 25 | 50 | 75 | 100 |
| Photoradical polymerization initiator (C-1) | DAROCUR1173 | 2 | 2 | 2 | 2 |
| Photoradical polymerization initiator (C-2) | IRGACURE819 | 1 | 1 | 1 | 1 |
| UV light irradiation conditions | Peak illuminance (mW/cm$^2$) | 500 | 500 | 500 | 500 |
| | Integrated light quantity (mJ/cm$^2$) | 2000 | 2000 | 2000 | 2000 |
| 180° peeling test (N/25 mm) | After 1 hour | 12.1 | 13.8 | 13.5 | 14.5 |
| | After 3 days | 14.5 | 15.0 | 14.8 | 15.3 |

[8]ISTA from Osaka Organic Chemical Industry Ltd.

Comparative Examples 24 to 27

An adhesive was prepared in the same manner as in Examples 1 to 5 except that isodecyl acrylate was used instead of isoboronyl acrylate. A 180° peeling test was conducted in the same manner except that the test was conducted after a lapse of 3 days after an adhesive tape was stuck to a SUS substrate.

The blending amount of the adhesive composition and the results of the peeling test are shown in Table 8.

TABLE 8

| Composition (part(s) by weight) | | Comparative Example | | | |
|---|---|---|---|---|---|
| | | 24 | 25 | 26 | 27 |
| (Meth)acrylic polymer (A-1) | | 100 | 100 | 100 | 100 |
| Isodecyl acrylate[9] | | 25 | 50 | 75 | 100 |
| Photoradical polymerization initiator (C-1) | DAROCUR1173 | 2 | 2 | 2 | 2 |
| Photoradical polymerization initiator (C-2) | IRGACURE819 | 1 | 1 | 1 | 1 |
| UV light irradiation conditions | Peak illuminance (mW/cm$^2$) | 500 | 500 | 500 | 500 |
| | Integrated light quantity (mJ/cm$^2$) | 2000 | 2000 | 2000 | 2000 |
| 180° peeling test | After 1 hour | 9.9 | 9.5 | 11.0 | 11.3 |
| (N/25 mm) | After 3 days | 10.6 | 10.3 | 10.9 | 13.4 |

[9]IDAA from Osaka Organic Chemical Industry Ltd.

Comparative Examples 28 to 31

An adhesive was prepared in the same manner as in Examples 1 to 5 except that paracumyl phenol EO-modified acrylate was used instead of isoboronyl acrylate. A 180° peeling test was conducted in the same manner except that the test was conducted after a lapse of 3 days after an adhesive tape was stuck to a SUS substrate.

The blending amount of the adhesive composition and the results of the peeling test are shown in Table 9.

TABLE 9

| Composition (part(s) by weight) | | Comparative Example | | | |
|---|---|---|---|---|---|
| | | 28 | 29 | 30 | 31 |
| (Meth)acrylic polymer (A-1) | | 100 | 100 | 100 | 100 |
| Paracumyl phenol EO modified acrylate[10] | | 25 | 50 | 75 | 100 |
| Photoradical polymerization initiator (C-1) | DAROCUR1173 | 2 | 2 | 2 | 2 |
| Photoradical polymerization initiator (C-2) | IRGACURE819 | 1 | 1 | 1 | 1 |
| UV light irradiation conditions | Peak illuminance (mW/cm$^2$) | 500 | 500 | 500 | 500 |
| | Integrated light quantity (mJ/cm$^2$) | 2000 | 2000 | 2000 | 2000 |
| 180° peeling test | After 1 hour | 8.7 | 10.0 | 11.4 | 12.8 |
| (N/25 mm) | After 3 days | 13.3 | 14.4 | 14.8 | 13.9 |

[10]Aronix M-110 from Toagosei Co., Ltd.

Comparative Examples 32 to 35

An adhesive was prepared in the same manner as in Examples 1 to 5 except that cyclohexyl acrylate was used instead of isoboronyl acrylate. A 180° peeling test was conducted in the same manner except that the test was conducted after a lapse of 3 days after an adhesive tape was stuck to a SUS substrate.

The blending amount of the adhesive composition and the results of the peeling test are shown in Table 10.

TABLE 10

| Composition (part(s) by weight) | | Comparative Example | | | |
|---|---|---|---|---|---|
| | | 32 | 33 | 34 | 35 |
| (Meth)acrylic polymer (A-1) | | 100 | 100 | 100 | 100 |
| Cyclohexyl acrylate[11] | | 25 | 50 | 75 | 100 |
| Photoradical polymerization initiator (C-1) | DAROCUR1173 | 2 | 2 | 2 | 2 |
| Photoradical polymerization initiator (C-2) | IRGACURE819 | 1 | 1 | 1 | 1 |
| UV light irradiation conditions | Peak illuminance (mW/cm$^2$) | 500 | 500 | 500 | 500 |
| | Integrated light quantity (mJ/cm$^2$) | 2000 | 2000 | 2000 | 2000 |
| 180° peeling test | After 1 hour | 15.3 | 18.1 | 22.0 | 18.1 |
| (N/25 mm) | After 3 days | 16.2 | 19.9 | 22.2 | 27.8 |

[11]Viscoat #155 from Osaka Organic Chemical Industry Ltd.

Comparative Examples 36 to 39

An adhesive was prepared in the same manner as in Examples 1 to 5 except that dicyclopentenyl acrylate was used instead of isoboronyl acrylate. A 180° peeling test was conducted in the same manner except that the test was conducted after a lapse of 3 days after an adhesive tape was stuck to a SUS substrate.

The blending amount to of the adhesive composition and the results of the peeling test are shown in Table 11.

TABLE 11

| Composition (part(s) by weight) | | Comparative Example | | | |
|---|---|---|---|---|---|
| | | 36 | 37 | 38 | 39 |
| (Meth)acrylic polymer (A-1) | | 100 | 100 | 100 | 100 |
| Dicyclopentenyl acrylate[12] | | 25 | 50 | 75 | 100 |
| Photoradical polymerization initiator (C-1) | DAROCUR1173 | 2 | 2 | 2 | 2 |
| Photoradical polymerization initiator (C-2) | IRGACURE819 | 1 | 1 | 1 | 1 |
| UV light irradiation conditions | Peak illuminance (mW/cm$^2$) | 500 | 500 | 500 | 500 |
| | Integrated light quantity (mJ/cm$^2$) | 2000 | 2000 | 2000 | 2000 |
| 180° peeling test | After 1 hour | 2.6 | 1.8 | 1.6 | 0.9 |
| (N/25 mm) | After 3 days | 2.2 | 0.9 | 1.1 | 0.3 |

[12]FA-511 AS from Hitachi Chemical Co., Ltd.

Comparative Examples 40 to 43

An adhesive was prepared in the same manner as in Examples 1 to 5 except that dicyclopentenyloxy acrylate was used instead of isoboronyl acrylate, A 180° peeling test was conducted in the same manner except that the test was conducted after a lapse of 3 days after an adhesive tape was stuck to a SUS substrate.

The blending amount of the adhesive composition and the results of the peeling test are shown in Table 12.

TABLE 12

| Composition (part(s) by weight) | | Comparative Example | | | |
|---|---|---|---|---|---|
| | | 40 | 41 | 42 | 43 |
| (Meth)acrylic polymer (A-1) | | 100 | 100 | 100 | 100 |
| Dicyclopentenyloxy acrylate[13] | | 25 | 50 | 75 | 100 |
| Photoradical polymerization initiator (C-1) | DAROCUR1173 | 2 | 2 | 2 | 2 |
| Photoradical polymerization initiator (C-2) | IRGACURE819 | 1 | 1 | 1 | 1 |
| UV light irradiation conditions | Peak illuminance (mW/cm$^2$) | 500 | 500 | 500 | 500 |
| | Integrated light quantity (mJ/cm$^2$) | 2000 | 2000 | 2000 | 2000 |
| 180° peeling test | After 1 hour | 0.9 | 0.7 | 1.2 | 1.3 |
| (N/25 mm) | After 3 days | 1.5 | 1.0 | 1.3 | 1.6 |

[13]FA-512 AS from Hitachi Chemical Co., Ltd.

It is clear that the adhesive compositions described in Examples 1 to 10 exhibit excellent.

Examples 11 to 16

Adhesive compositions were obtained in the same manner as in Examples 1 to 5.

The obtained composition was coated onto a PET film (Lumirror U34 manufactured by Toray Industries, Inc.) having a thickness of 100 μm so that the composition had a thickness of 50 μm or 100 μm, and a releasing PET film was stuck to the coated surface. While the releasing PET film was stuck, the composition was irradiated with light in the same manner as in Examples 1 to 5, and the obtained cured product was cut to a width of 25 mm and a length of 125 mm to prepare an adhesive tape.

The releasing PET film was peeled off from the obtained adhesive tape and the adhesive tape was stuck to a stainless steel plate SUS #304 Whose surface finish was BA using a 2 kg pressure-bonding roller. After a lapse of 1 hour after the sticking and 3 days after the sticking, the adhesive force was measured in the same manner as in Examples 1 to 5.

A sample for optical measurement was prepared by sticking an adhesive tape to glass. Haze was measured by a method according to JIS K 7136 using HZ-V3 manufactured by Suga Test Instruments Co., Ltd. In addition, a chromaticness index b* was measured by SC-P manufactured by Suga Test Instruments Co., Ltd.

The blending amount of the adhesive composition, the results of the peeling test, and the results of the optical measurement are shown in Table 13.

TABLE 13

| Composition (part(s) by weight) | Example | | | | | |
|---|---|---|---|---|---|---|
| | 11 | 12 | 13 | 14 | 15 | 16 |
| (Meth)acrylic polymer (A-1) | 100 | 100 | 100 | 100 | 100 | 100 |
| Isoboronyl acrylate (B) | 50 | 50 | 50 | 50 | 60 | 50 |

TABLE 13-continued

|  |  | Example | | | | | |
|---|---|---|---|---|---|---|---|
| Composition (part(s) by weight) |  | 11 | 12 | 13 | 14 | 15 | 16 |
| Photoradical polymerization initiator (C-1) | DAROCUR1173 | 2 | 2 | 2 | 1 | 2 | 2 |
| Photoradical polymerization initiator (C-2) | IRGACURE819 | 1 | 1 | 1 | 0.5 | 1 | 1 |
| Coated thickness of adhesive |  | 50 | 50 | 50 | 100 | 100 | 100 |
| UV light irradiation conditions | Peak illuminance (mW/cm$^2$) | 100 | 250 | 500 | 100 | 250 | 500 |
|  | Integrated light quantity (mJ/cm$^2$) | 2000 | 2000 | 2000 | 2000 | 2000 | 2000 |
| 180° peeling test | After 1 hour | 27.5 | 41.6 | 41.5 | 31.7 | 40.1 | 36.7 |
| (N/25 mm) | After 3 days | 46.0 | 47.0 | 41.9 | 47.4 | 46.6 | 44.4 |
| Optical measurement | Haze | 0.69 | 0.29 | 0.49 | 0.50 | 0.45 | 0.42 |
|  | b* | 0.19 | 0.18 | 0.38 | 0.27 | 0.30 | 0.25 |

It is clear that the adhesive compositions described in Examples 11 to 16 exhibit excellent adhesive forces, have low haze values, and are excellent in optical properties.

Comparative Synthesis Example 1

In accordance with the known method (described in Japanese Patent Application Laid-Open No. 2012-211216); cuprous bromide as a catalyst, pentamethyldiethylenetriamine as a ligand, diethyl-2,5-dibromoadipate as an initiator, and 100 parts by weight of n-butyl acrylate as a monomer were subjected to polymerization at a weight-based ratio of a monomer/a initiator of 160 to obtain a bromine-terminated poly(n-butyl acrylate) polymer.

This polymer was dissolved in N, N-dimethylacetamide, potassium acrylate was added thereto, and the mixture was heated with stirring at 70° C. in a nitrogen atmosphere. After distilling off the N, N-dimethylacetamide in the mixture under reduced pressure, butyl acetate was added to the residue, and the insoluble matter was removed by filtration. The butyl acetate in the filtrate was distilled off under reduced pressure to obtain a poly(n-butyl acrylate) polymer (A2) having acryloyl groups at both terminals.

The number average molecular weight of the polymer (A2) was about 23,000, and the molecular weight distribution thereof was 1.1. The "number average molecular weight" and the "molecular weight distribution (a ratio of the weight average molecular weight to the number average molecular weight)" were calculated by a standard polystyrene equivalent method using gel permeation chromatography (GPC). A GPC column packed with a polystyrene crosslinked gel (Shodex GPC K-804, K-802.5; manufactured by SHOWA DENKO K. K.) was used, and chloroform was used as a GPC solvent.

The average number of acryloyl groups introduced per one molecule of the polymer was found to be about 1.8 as determined by $^1$H-NMR analysis. The number of functional groups introduced per one molecule of the polymer was calculated based on concentration analysis by $^1$H-NMR and number average molecular weight determined by GPC. However, NMR was measured at 23° C. using an ASX-400 manufactured by Bruker and deuterated chloroform as a solvent.

Comparative Synthesis Example 2

In accordance with the known method (described in Japanese Patent Application Laid-Open No. 2012-211216), cuprous bromide as a catalyst, pentamethyldiethylenetriamine as a ligand, diethyl-2,5-dibromoadipate as an initiator, and 25 parts by weight of n-butyl acrylate, 46 parts by weight of ethyl acrylate, and 29 parts by weight of methoxyethyl acrylate as monomers were subjected to polymerization at a weight-based ratio of monomers/a initiator of 120 to obtain a bromine-terminated poly(n-butyl acrylate/ ethyl acrylate/ methoxyethyl acrylate) copolymer.

This polymer was dissolved in N, N-dimethylacetamide, potassium acrylate was added thereto, and the mixture was heated with stirring at 70° C. in a nitrogen atmosphere. After distilling off the N, N-dimethylacetamide in the mixture under reduced pressure, butyl acetate was added to the residue, and the insoluble matter was removed by filtration. The butyl acetate in the filtrate was distilled off under reduced pressure to obtain a poly(n-butyl acrylate/ ethyl acrylate/ methoxyethyl acrylate) copolymer (A3) having acryloyl groups at both terminals.

The number average molecular weight of the polymer (A3) was about 16,000, and the molecular/eight distribution thereof was 1.1. The "number average molecular weight" and the "molecular weight distribution (a ratio of the weight average molecular weight to the number average molecular weight)" were calculated by a standard polystyrene equivalent method using gel permeation chromatography (GPC). A GPC column packed with a polystyrene crosslinked gel (Shodex GPC K-804, K-802.5; manufactured by SHOWA DENKO K. K.) was used, and chloroform was used as a GPC solvent.

The average number of acryloyl groups introduced per one molecule of the polymer was found to be about 1.8 as determined by $^1$H-NMR analysis. The number of functional groups introduced per one molecule of the polymer was calculated based on concentration analysis by $^1$H-NMR and number average molecular weight determined by GPC. However, NMR was measured at 23° C. using an ASX-400 manufactured by Bruker and deuterated chloroform as a solvent.

Comparative Synthesis Example 3

In accordance with the known method (described in Japanese Patent Application Laid-Open No. 2012-211216), cuprous bromide as a catalyst, pentamethyldiethylenetriamine as a ligand, diethyl-2,5-dibromoadipate as an initiator, and 68.08 parts by weight of n-butyl acrylate, 29.92 parts by weight of ethyl acrylate, and 2 parts by weight of methoxyethyl acrylate as monomers were subjected to polymerization at a weight-based ratio of monomers/a initiator of 240 to obtain a bromine-terminated poly(n-butyl acrylate/ethyl acrylate/methoxyethyl acrylate) copolymer.

This polymer was dissolved in N, N-dimethylacetamide, potassium acrylate was added thereto, and the mixture was heated with stirring at 70° C. in a nitrogen atmosphere. After distilling off the N, N-dimethyl acetamide in the mixture under reduced pressure, butyl acetate was added to the residue, and the insoluble matter was removed by filtration. The butyl acetate in the filtrate was distilled off under reduced pressure to obtain a poly(n-butyl acrylate/ethyl acrylate/methoxyethyl acrylate) copolymer (A4) having acryloyl groups at both terminals.

The number average molecular weight of the polymer (A4) was about 34,000, and the molecular weight distribution thereof was 1.1. The "number average molecular weight" and the "molecular weight distribution (a ratio of the weight average molecular weight to the number average molecular weight)" were calculated by a standard polystyrene equivalent method using gel permeation chromatography (GPC). A GPC column packed with a polystyrene crosslinked gel (Shodex GPC K-804, K-802.5; manufactured by SHOWA DENKO K. K.) was used, and chloroform was used as a GPC solvent.

The average number of acryloyl groups introduced per one molecule of the polymer was found to be about 1.8 as determined by $^1$H-NMR analysis. The number of functional groups introduced per one molecule of the polymer was calculated based on concentration analysis by $^1$H-NMR and number average molecular weight determined by GPC, However, NMR was measured at 23° C. using an ASX-400 manufactured by Bruker and deuterated chloroform as a solvent.

Comparative Examples 44 to 48

An adhesive was prepared in the same manner as in Examples 1 to 5, using the polymer (A2) obtained in Comparative Synthesis Example 1, isoboronyl acrylate, and a photoradical polymerization initiator, and a 180° peeling test was conducted after a lapse of 1 hour after the sticking and 3 days after the sticking.

The blending amount of the adhesive composition and the results of the peeling test are shown in Table 14.

TABLE 14

| | | Comparative Example | | | | |
|---|---|---|---|---|---|---|
| Composition (part(s) by weight) | | 44 | 45 | 46 | 47 | 48 |
| (Meth)acrylic polymer (A-2) | | 100 | 100 | 100 | 100 | 100 |
| Isoboronyl acrylate (B) [1] | | 30 | 40 | 50 | 60 | 70 |
| Photoradical polymerization initiator (C-1) | DAROCUR1173 | 2 | 2 | 2 | 2 | 2 |
| Photoradical polymerization initiator (C-2) | IRGACURE819 | 1 | 1 | 1 | 1 | 1 |
| UV light irradiation conditions | Peak illuminance (mW/cm$^2$) | 250 | 250 | 250 | 250 | 250 |
| | Integrated light quantity (mJ/cm$^2$) | 2000 | 2000 | 2000 | 2000 | 2000 |
| 180° peeling test (N/25 mm) | After 1 hour | 5 | 8 | 5 | 7 | 3 |
| | After 3 days | 8 | 13 | 6 | 12 | 7 |

[1] IBXA from Osaka Organic Chemical Industry Ltd.
3), 4) from BASF Japan

Comparative Examples 49 to 53

An adhesive was prepared in the same manner as in Examples 1 to 5, using the polymer (A3) obtained in Comparative Synthesis Example 2, isoboronyl acrylate, and a photoradical polymerization initiator, and a 180° peeling test was conducted after a lapse of 1 hour after the sticking and 3 days after the sticking.

The blending amount of the adhesive composition and the results of the peeling test are shown in Table 15.

TABLE 15

| | | Comparative Example | | | | |
|---|---|---|---|---|---|---|
| Composition (part(s) by weight) | | 49 | 50 | 51 | 52 | 53 |
| (Meth)acrylic polymer (A-3) | | 100 | 100 | 100 | 100 | 100 |
| Isoboronyl acrylate (B) [1] | | 30 | 40 | 50 | 60 | 70 |
| Photoradical polymerization initiator (C-1) | DAROCUR1173 | 2 | 2 | 2 | 2 | 2 |
| Photoradical polymerization initiator (C-2) | IRGACURE819 | 1 | 1 | 1 | 1 | 1 |
| UV light irradiation conditions | Peak illuminance (mW/cm$^2$) | 250 | 250 | 250 | 250 | 250 |
| | Integrated light quantity (mJ/cm$^2$) | 2000 | 2000 | 2000 | 2000 | 2000 |
| 180° peeling test (N/25 mm) | After 1 hour | 0 | 0 | 0 | 0 | 0 |
| | After 3 days | 1 | 1 | 1 | 1 | 1 |

[1] IBXA from Osaka Organic Chemical Industry Ltd.
3), 4) from BASF Japan

Comparative Examples 54 to 58

An adhesive was prepared in the same manner as in Examples 1 to 5, using the polymer (A4) obtained in Comparative Synthesis Example 3, isoboronyl acrylate, and a photoradical polymerization initiator, and a 180° peeling test was conducted after a lapse of 1 hour after the sticking and 3 days after the sticking.

The blending amount of the adhesive composition and the results of the peeling test are shown in Table 16.

TABLE 16

| Composition (part(s) by weight) | | Comparative Example | | | | |
|---|---|---|---|---|---|---|
| | | 54 | 55 | 56 | 57 | 58 |
| (Meth)acrylic polymer (A-4) | | 100 | 100 | 100 | 100 | 100 |
| Isoboronyl acrylate (B) [1)] | | 30 | 40 | 50 | 60 | 70 |
| Photoradical polymerization initiator (C-1) | DAROCUR1173 | 2 | 2 | 2 | 2 | 2 |
| Photoradical polymerization initiator (C-2) | IRGACURE819 | 1 | 1 | 1 | 1 | 1 |
| UV light irradiation conditions | Peak illuminance (mW/cm$^2$) | 250 | 250 | 250 | 250 | 250 |
| | Integrated light quantity (mJ/cm$^2$) | 2000 | 2000 | 2000 | 2000 | 2000 |
| 180° peeling test (N/25 mm) | After 1 hour | 12 | 4 | 2 | 1 | 1 |
| | After 3 days | 16 | 4 | 8 | 2 | 2 |

[1)] IBXA from Osaka Organic Chemical Industry Ltd.
3), 4) from BASF Japan

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An adhesive composition, comprising:
   100 parts by weight of a (meth)acrylic polymer (A);
   45 to 65 parts by weight of isobornyl acrylate (B); and
   0.1 to 10 parts by weight of a photoradical polymerization initiator (C),
   wherein each molecule of the (meth)acrylic polymer (A) has at least one group represented by general formula (1) at a molecular terminal:

$$-OC(O)C(R^1)=CH_2 \quad (1)$$

where $R^1$ is a hydrogen atom or an organic group containing 1 to 20 carbon atoms,
   wherein the (meth)acrylic polymer (A) has a number average molecular weight (Mn) of 3,000 to 100,000, and a ratio (Mw/Mn) of a weight average molecular weight (Mw) to the number average molecular weight (Mn) of less than 1.8,
   wherein the (meth)acrylic polymer (A) is a copolymer and comprises n-butyl acrylate and 2-ethylhexyl acrylate as monomer components,
   wherein the (meth)acrylic polymer (A) comprises the n-butyl acrylate and the 2-ethylhexyl acrylate in a weight ratio of n-butyl acrylate to 2-ethylhexyl acrylate of 20/80 to 80/20.

2. The composition according to claim 1, further comprising 0.05 to 4.00 parts by weight of an acrylic acid (D).

3. An adhesive comprising the composition according to claim 1, wherein the composition has been cured by light.

4. The adhesive according to claim 3, wherein the light is provided by a light source selected from a high-pressure mercury lamp, a metal halide lamp, a UV-LED, and an LED.

* * * * *